US009227155B2

(12) United States Patent
Ahn

(10) Patent No.: US 9,227,155 B2
(45) Date of Patent: Jan. 5, 2016

(54) APPARATUS AND METHOD FOR PURIFYING GAS

(71) Applicant: Samsung Display Co., Ltd., Yongin, Gyeonggi-Do (KR)

(72) Inventor: Kyung-Hyun Ahn, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/086,669

(22) Filed: Nov. 21, 2013

(65) Prior Publication Data

US 2014/0322071 A1 Oct. 30, 2014

(30) Foreign Application Priority Data

Apr. 24, 2013 (KR) .................. 10-2013-0045559

(51) Int. Cl.
*A61L 9/00* (2006.01)
*A62B 7/08* (2006.01)
*B01D 53/22* (2006.01)

(52) U.S. Cl.
CPC .......... *B01D 53/229* (2013.01); *B01D 2256/12* (2013.01); *B01D 2257/80* (2013.01); *B01D 2258/0216* (2013.01)

(58) Field of Classification Search
CPC ............. A61L 9/00; A61L 9/015; A61L 9/02; A61L 9/04; A61L 9/12; A61L 9/14; A61L 9/16; B01D 53/229
USPC ........................................................ 422/120
See application file for complete search history.

(56) References Cited

U.S. PATENT DOCUMENTS

| 2,248,713 | A  | * | 7/1941  | Locke ........................ 422/121 |
| 5,427,693 | A  | * | 6/1995  | Mausgrover et al. ......... 210/739 |
| 5,647,890 | A  | * | 7/1997  | Yamamoto ..................... 95/69 |
| 5,835,840 | A  | * | 11/1998 | Goswami .................. 422/186.3 |
| 5,997,619 | A  | * | 12/1999 | Knuth et al. ................... 96/224 |
| 6,488,900 | B1 | * | 12/2002 | Call et al. .................... 422/173 |
| 6,509,562 | B1 | * | 1/2003  | Yang et al. ................... 250/287 |
| 7,063,820 | B2 | * | 6/2006  | Goswami .................. 422/186.3 |
| 7,089,763 | B2 | * | 8/2006  | Forsberg et al. ................ 62/635 |
| 7,566,359 | B2 | * | 7/2009  | Goel et al. ..................... 96/224 |
| 7,635,450 | B2 | * | 12/2009 | Goswami ...................... 422/22 |
| 7,658,891 | B1 | * | 2/2010  | Barnes .................... 422/186.03 |
| 2002/0020185 | A1 | * | 2/2002  | Carr ............................. 62/310 |
| 2002/0094298 | A1 | * | 7/2002  | Monagan ........................ 422/5 |

(Continued)

FOREIGN PATENT DOCUMENTS

JP 07-281446 10/1995
KR 20-0125873 6/1998

(Continued)

OTHER PUBLICATIONS

English translation of JP 07-281446, Oct. 27, 1995.*

*Primary Examiner* — Regina M Yoo
(74) *Attorney, Agent, or Firm* — Robert E. Bushnell, Esq.

(57) ABSTRACT

A gas purifying apparatus and a method thereof are disclosed. According to an exemplary embodiment, a gas purifying apparatus includes a first chamber comprising a first inlet into which a first fluid flows and a first outlet through which a part of the first fluid is discharged, a purifier which purifies air from the first chamber, which air is then re-injected into the first chamber and a conduit which transports air from the first chamber to the purifier.

10 Claims, 5 Drawing Sheets

(56) References Cited

U.S. PATENT DOCUMENTS

| | | | |
|---|---|---|---|
| 2002/0098109 A1* | 7/2002 | Nelson et al. | 422/5 |
| 2002/0114727 A1* | 8/2002 | McVey et al. | 422/4 |
| 2004/0255989 A1* | 12/2004 | Wirth | 134/94.1 |
| 2006/0177356 A1* | 8/2006 | Miller | 422/121 |
| 2010/0028217 A1* | 2/2010 | Hache | 422/120 |
| 2010/0263751 A1* | 10/2010 | Ringuette | 137/565.17 |
| 2011/0154985 A1* | 6/2011 | Mittelmark | 95/1 |

FOREIGN PATENT DOCUMENTS

| | | |
|---|---|---|
| KR | 100729996 | 6/2007 |
| KR | 1020110059225 | 6/2011 |
| KR | 1020110048315 A | 11/2011 |

* cited by examiner

APPARATUS AND METHOD FOR PURIFYING GAS

CLAIM OF PRIORITY

This application makes reference to, incorporates the same herein, and claims all benefits accruing under 35 U.S.C. §119 from an application for APPARATUS AND METHOD FOR PURIFYING GAS earlier filed in the Korean Intellectual Property Office on 24 Apr. 2013 and there duly assigned Serial No. 10-2013-0045559.

BACKGROUND OF THE INVENTION

1. Field of the Invention

The present disclosure relates to a gas purifying apparatus and a method thereof.

2. Description of the Related Art

In various industries, in order to protect materials from moisture or oxygen, a vacuum pump is used to remove the moisture or the oxygen in a sealed chamber creating a vacuum in the chamber or a predetermined area.

When the vaccumization is performed for a predetermined time, an attached glove such as a glove box is used to manually perform the job or a robot having a simple configuration which is provided outside the chamber is used to automatically perform the process.

Instead of a vacuum, inert gas can be partially used to manage the gas atmosphere in a small size of a predetermined area, but this has limitations in application.

If a vacuum chamber is used, it takes long time to maintain a desired degree of vacuum, and it is difficult to control the air flow.

For example, the inside of the chamber is evacuated so that a driving unit, which performs the process, such as a motor or a cylinder cannot be provided and only some of the driving units are provided outside the chamber with a limited configuration and then need to be connected to the chamber while maintaining a sealed chamber.

However, available uses for the chamber are limited and it is very difficult to monitor and manage the inside of the chamber.

Further, it is required to monitor the inside of the chamber from the viewpoint of management, maintenance, and repair of the process progress. However, it is difficult to be observed by eye in a vacuum status and to install an illumination or a camera so that there are many restrictions.

When inert gas is used as described above, the purifying apparatus is connected to a general gas purifier so that application size is limited to a very small size. Further, it is difficult to manage purity precisely. If the purifying apparatus is applied to a large size display, it is inefficient.

The above information disclosed in this Background section is only for enhancement of understanding of the background of the invention and therefore it may contain information that does not form the prior art which is already known in this country to a person of ordinary skill in the art.

SUMMARY OF THE INVENTION

The present invention has been made in an effort to provide a gas purifying apparatus and a method thereof having advantages of being separated from the atmosphere, managing foreign substances, and driving various equipment in the chamber.

An exemplary embodiment provides a gas purifying apparatus including: a first chamber having a first inlet into which a first fluid flows and a first outlet through which a part of the first fluid is discharged; and a purifier which purifies air in the first chamber and re-injects the purified air into the first chamber.

In this case, the first fluid may include He, Ne, Ar and $N_2$ as an inert gas.

Further, in the purifier, a second inlet into which a second fluid flows and a second outlet through which a reaction gas generated after the second fluid reacts in the purifier is discharged may be disposed.

Further, a vacuum pump may be provided in the outlet.

Further, the gas purifying apparatus may further include a blower which injects the air which is purified from the purifier into the first chamber.

The gas purifying apparatus may further include a cooler which is provided at a rear end of the blower to cool heat generated during a gas purification process.

The gas purifying apparatus may further include a first filter unit which filters air to be injected into the purifier and a second filter unit which filters the air purified from the purifier.

Further, the first and second filters may be provided in the first chamber.

Further, the gas purifying apparatus may further include a second chamber which is disposed outside the first chamber, in which the purifier, the blower, and the cooler may be provided.

Another exemplary embodiment of the present invention provides a gas purifying method which uses the gas purifying apparatus to purify gas, including: allowing a first fluid, which is flowable in a first chamber, to flow into the first chamber; passing air in the first chamber through a filter unit; allowing air which passes through the filter unit to flow into a purifier; allowing air which is purified in the purifier to flow into the filter unit; allowing the air which passes through the filter unit to flow into the first chamber; and discharging a part of the first fluid to the outside of the first chamber.

The gas purifying method may further include allowing a second fluid to flow into the purifier to react the second fluid with a gas saturated in the purifier and then discharging gas generated after the reaction.

The gas purifying method may further include discharging cooling water to the outside of a cooler after allowing the cooling water to flow into the cooler to cool heat generated in the purifier.

Yet another exemplary embodiment of the present invention provides a gas purifying apparatus including: a first chamber which is divided into a first space and a second space by a filter unit and has a flow channel through which a first fluid flows into the first and second spaces; and a purifier which purifies the first fluid in the first chamber to inject the first fluid into the first chamber.

In this case, a membrane into which the fluid passing through the filter unit flows may be provided.

Further, a porous plate into which the fluid passing through the membrane flows may be provided in the first chamber.

The gas purifying apparatus may further include a blower which allows flows the fluid passing through the porous plate to flow into the filter unit through the flow channel.

Further, the gas purifying apparatus may further include a cooler which is provided at a rear end of the blower to cool heat generated during a process.

Further, the blower and the cooler may be provided inside or outside the first space.

The purifier may include a third inlet into which a second fluid flows and a third outlet through which the reaction gas generated after reacting the second fluid in the purifier is discharged.

Further, a vacuum pump may be provided at the third outlet.

Still another exemplary embodiment of the present invention provides a gas purifying method which uses the gas purifying apparatus to purify a gas, including: allowing a first fluid disposed in a first space of a first chamber to flow into a filter unit; allowing the first fluid which passes through the filter unit to flow into a second space of the first chamber; allowing the first fluid in the second space to flow into the first space by a thermal converter of the first space along a flow channel; allowing the first fluid in the first chamber to flow into a purifier; and allowing air purified in a purifier to flow into the first chamber.

In this case, the gas purifying method may further include passing the first fluid which passes through the filter unit through a membrane.

Further, the gas purifying method may further include passing the first fluid which passes through the membrane through a porous plate.

The gas purifying method may further include allowing the second fluid to flow into the purifier to react the second fluid with a gas saturated in the purifier and discharging a gas generated after the reaction.

The gas purifying apparatus may further include allowing cooling water to flow into a cooler to cool heat generated in the purifier and then discharging the cooling water outside the cooler.

The gas purifying apparatus and method according to an exemplary embodiment uses a chamber which is maintained and managed by a highly pure inert gas so as to be separated from the atmosphere and manage the alien substance and drive the various equipment in the chamber so that the process may be efficiently performed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
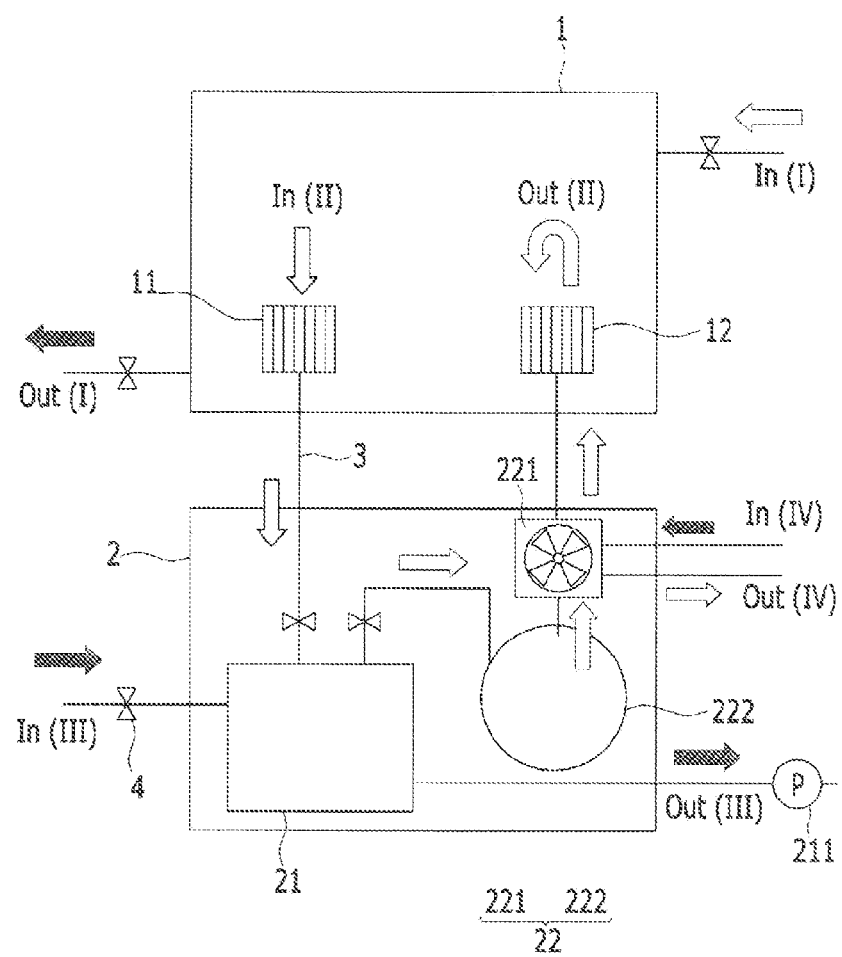
FIG. 1 is a view illustrating a gas purifying apparatus according to an exemplary embodiment.

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention. The drawings and description are to be regarded as illustrative in nature and not restrictive. Like reference numerals designate like elements throughout the specification.

Hereinafter, a gas purifying apparatus and a method thereof according to exemplary embodiments will be described in more detail with reference to the drawings.

FIG. 1 is a view illustrating a gas purifying apparatus according to an exemplary embodiment.

Referring to FIG. 1, a gas purifying apparatus according to the exemplary embodiment includes a first chamber 1, a purifier 21, a blower 221, and a cooler 222.

The first chamber 1 is provided so as to provide various equipment therein and serves to separate the equipment from the atmosphere and manage foreign substances.

In this case, as shown in FIG. 1, in the first chamber 1, a first inlet In (I) into which a first fluid flows and a first outlet Out (I) through which a part of the first fluid is discharged are present.

Here, the first fluid may be an inert gas.

In the exemplary embodiment, instead of creating a vacuum atmosphere, the first chamber is filled with the inlet gas which does not chemically react due to having a stable atomic or molecular structure to create an inert atmosphere in the first chamber.

Suitable inert gases include helium (He), neon (Ne), argon (Ar), and nitrogen ($N_2$). As a monoatomic gas, argon (Ar) is mainly used and as a polyatomic molecule, nitrogen ($N_2$), which is formed by triple bond to have structural stability, is mainly used. In the electronics industry such as a semiconductor or a display, nitrogen ($N_2$) is mainly used because gas flow is easily managed.

More specifically, as shown in FIG. 1, after flowing an inert gas, for example nitrogen gas having a high purity, into the first chamber 1 through the first inlet In (I) disposed in the first chamber 1, a part of the inflowing nitrogen gas is discharged through the first outlet Out(I) (purging)

In this case, at a front end of the first inlet In(I) of the first chamber 1 and at a rear end of the first outlet Out(I), a pressure gauge (not shown) and a valve 4 may be provided.

By doing this, the first chamber 1 is pressurized to flow the nitrogen gas therein, and discharge the nitrogen gas therefrom, and adjust the amount of inflowing or discharged gas.

In FIG. 1, even though the first inlet In(I) is provided above the first chamber 1 and the first outlet Out(I) is provided below the first chamber 1, the positions of the inlet and outlet may be changed in accordance with the molecular weight of the gas so that the nitrogen gas may flow up to down or down to up.

In the meantime, the first chamber 1 may include one or more filter units.

If the inert gas flows in the first chamber 1, air which has been present in the first chamber 1 flows into the purifier 21, which will be described below, to be purified. Before flowing the air in the purifier 21, the air is injected into a first filter unit 11 (In(II)) to be first filtered.

Then, if the air which is purified in the purifier 21 which will be described below is injected into the first chamber 1 again, the air is again filtered through a second filter unit 12 and then discharged (Out (II)) (circulation).

According to an exemplary embodiment, the filter unit is configured by the first and second filter units 11 and 12, but is not limited thereto.

In the meantime, the purifier 21 purifies the air in the first chamber 1, which flows from the first chamber 1, and then reinjects the air into the first chamber 1.

To this end, the air may flow into the purifier 21 through a conduit from the first chamber 1 or the first filter 11 provided in the first chamber 1 and the purified air may be discharged so that the purified air is reinjected into the first chamber 1.

The conduit may be a pipe or any other suitable connector or means to flow liquid or gas from the first chamber to the purifier 21.

Further, in the purifier 21, a second inlet In(III) into which a second fluid flows and a second outlet Out(III) through which contaminated gas generated after the second fluid reacts in the purifier 21 is discharged are disposed.

More specifically, moisture and oxygen from the air which flows from the first chamber 1 to the purifier 21 are collected by the filter in the purifier 21.

In this case, in a repeated process, moisture and oxygen may be saturated in the purifier 21 and thus the second fluid flows into the purifier 21 in order to remove the saturated moisture and oxygen.

Here, the second fluid may be a mixed gas of hydrogen ($H_2$)/nitrogen ($N_2$).

The mixed gas of hydrogen ($H_2$)/nitrogen ($N_2$) is injected into the second inlet In(III) of the purifier 21 to remove the moisture and the oxygen to restore the purifier 21 and unnecessary contaminated gas is drawn and discharged through the second outlet Out (III) (regeneration).

In this case, a vacuum pump 211 may be provided at a rear end of the second outlet Out(III).

A blower 221 is provided to guide the air purified from the purifier 21 to flow the gas into the first chamber 1.

Here, at a rear end of the blower 221, a cooler which cools heat inevitably generated during a gas purifying process may be provided.

In this case, the cooler may be configured in the form of a fan, but cooling by flowing and discharging cooling water through a pipe may also be provided.

To this end, as shown in FIG. 1, in the cooler, an inlet IN(IV) and an outlet Out(IV) which flows and discharges the cooling water may be formed (cooling).

In the meantime, the purifier 21, the blower 221, and the cooler 222 may be provided in the second chamber 2 which is separated from the first chamber 1.

The purging, circulating, regenerating, and cooling processes may be solely performed or combined to be performed in accordance with the purity, tact time, and gas replacement cycle by the maintenance of the equipment, which are required in gas purification processes.

Figure 2:
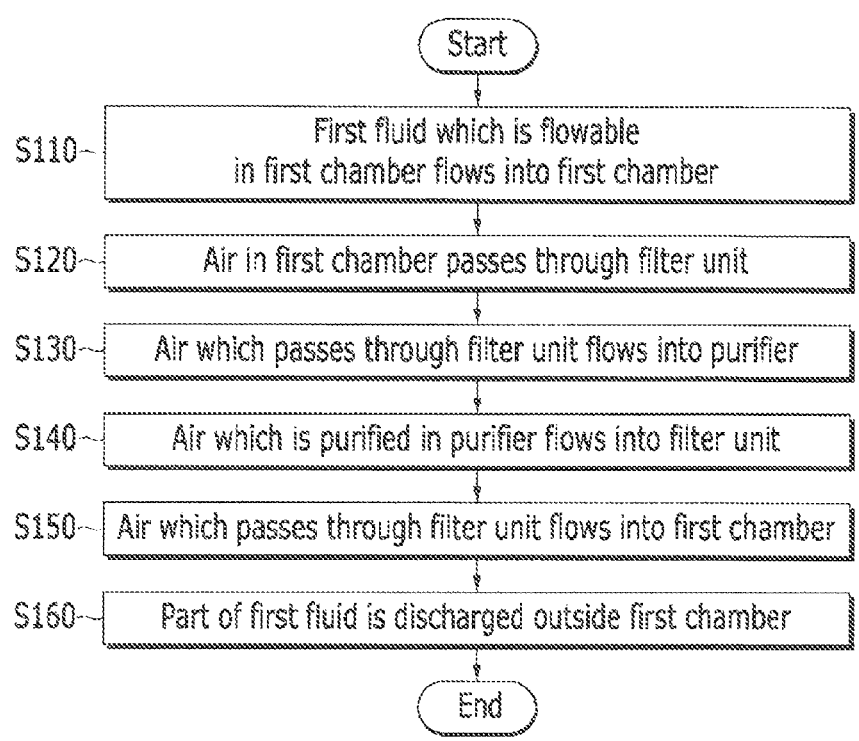
FIG. 2 is a flowchart illustrating a gas purifying method according to an exemplary embodiment.

FIG. 2 is a flowchart illustrating a gas purifying method according to an exemplary embodiment.

Here, the gas purifying method which uses the above-described gas purifying apparatus to purify the gas will be described in more detail.

Referring to FIG. 2, first, in step S110, a first fluid which is flowable in the first chamber 1 flows into the first chamber 1.

In step S120, as the first fluid flows in the first chamber 1, the air which has been present in the first chamber 1 flows into the first filter unit 11 to pass through the first filter unit 11.

In step S130, the air which is filtered in the first filter unit 11 flows in the purifier 21 through a pipe.

In step S140, the air which is purified in the purifier 21 flows in the second filter unit 12 again along the pipe and in step S150, the air which is filtered in the second filter unit 12 flows into the first chamber 1 again.

In this case, the gas purifying method may further include a step of allowing a cooling water to flow into a cooler in order to cool heat generated during the purification in the purifier 21 and then discharging the cooling water outside the cooler.

In step S160, as the filtered air flows in the first chamber 1, a part of the first fluid which has been present in the first chamber 1 is discharged to the outside of the first chamber 1.

The steps S110 to S160 may be repeated several times. When a series of the above processes is performed, moisture or oxygen may be saturated in the purifier 21. In order to remove the saturated gas, the gas purifying method may further include allowing a second fluid to flow and discharging a reaction gas generated by reacting the second fluid with the saturated gas.

Figure 3:
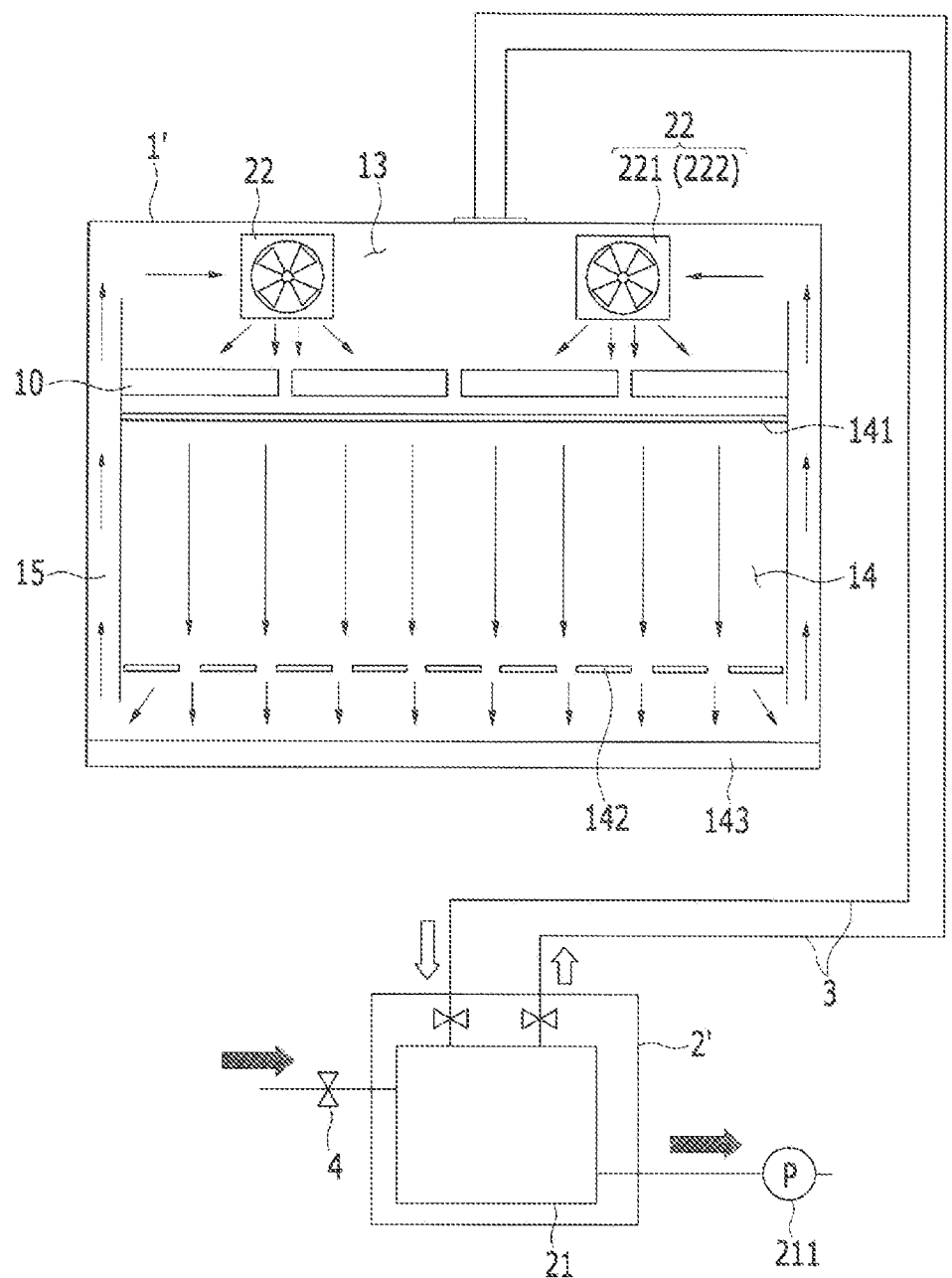
FIG. 3 is a view illustrating a gas purifying apparatus according to another exemplary embodiment.
Figure 4:
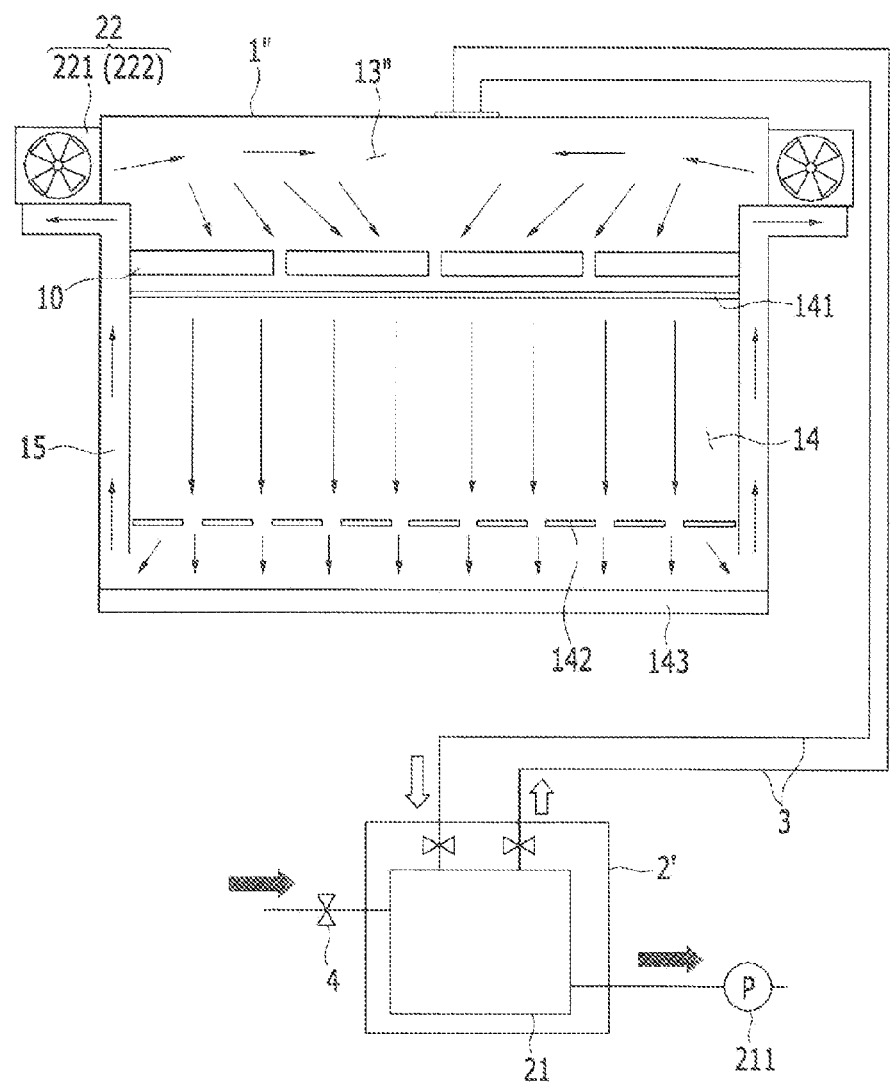
FIG. 4 is a view illustrating a gas purifying apparatus according to still another exemplary embodiment.

FIG. 3 is view illustrating a gas purifying apparatus according to another exemplary embodiment. FIG. 4 is view illustrating a gas purifying apparatus according to another exemplary embodiment.

In FIGS. 3 and 4, the same components as shown in FIG. 1 are denoted by the same reference numerals and the description thereof may be omitted.

Referring to FIGS. 3 and 4, the gas purifying apparatus according to another exemplary embodiment may include first chambers 1' or 1" and a purifier 21.

As described above, the first chamber 1' or 1" is provided to provide various equipment therein and to separate the equipment from the atmosphere and manage foreign substances.

In this case, as shown in FIGS. 3 and 4, the first chamber 1' or 1" is divided into a first space 13 and a second space 14 by the filter units 10.

In FIGS. 3 and 4, the filter units 10 are illustrated so as to be arranged in a horizontal direction, but are not limited thereto.

Further, a flow channel 15 which connects the first space 13 and the second space 14 to allow the fluid to flow in the first space 13 and the second space 14 may be provided at one side or both sides of the first chamber 1' or 1".

More specifically, in the first space 13, as shown in FIGS. 3 and 4, a thermal converter 22 may be provided inside or outside the first chamber 1' or 1".

Here, as shown in FIG. 4, if the thermal converter 22 is provided outside the first chamber 1' or 1", maintenance is convenient and the function may be desirably separated.

The thermal converter 22 may include a blower 221 and a cooler 222 in order to guide the fluid which passes through the flow channel 15 to flow into the filter units 10.

Further, a membrane 141 may be provided below the filter units 10 so that the gas which passes through the filter units 10 flows therein.

The membrane 141 is a device which selectively filters only a specific material. Therefore, if a gas which is primarily filtered by the filter units 10 flows into the membrane 141 so as to be secondarily filtered, an efficiency of removing foreign substances or moisture may be increased.

The gas which passes through the membrane 141, as shown in FIGS. 3 and 4, flows in the second space 14. Therefore, equipment or a device which performs the process may be provided in the second space 14.

A porous plate 142 may be provided below the second space 14.

If process equipment or a device is provided between the membrane 141 and the porous plate 142, laminar flow is guided in the direction of gravity so that it is very advantageous to manage the particles and maintain purity.

The gas, which passes through the porous plate 142 in accordance with laminar flow, is guided by a guide plate 143 which is a bottom surface of the second space 14 to flow into the flow channel 15 and then injected into the blower 221 and the cooler 222 of the first space 13 along the flow channel 15 so as to be reinjected into the filter unit 10.

The above processes may be repeated several times.

In the meantime, the gas in the first chamber 1' or 1" may flow into the purifier 21 as shown in FIGS. 3 and 4, and the purifier 21 purifies the inflow gas and then reinjects the inflow gas into the first chamber 1' or 1" (circulation).

In this case, the purifier 21 may be disposed in the second chamber 2', which is distinguished from the first chamber 1' or 1".

In the purifier 21, a third inlet into which the second fluid flows and a third outlet through which the second fluid is discharged are formed so that the contaminated gas which is produced by the purifying process is removed and the purifier 21 is restored (regeneration).

Further, a vacuum pump 211 may be provided at the rear end of the outlet.

Figure 5:
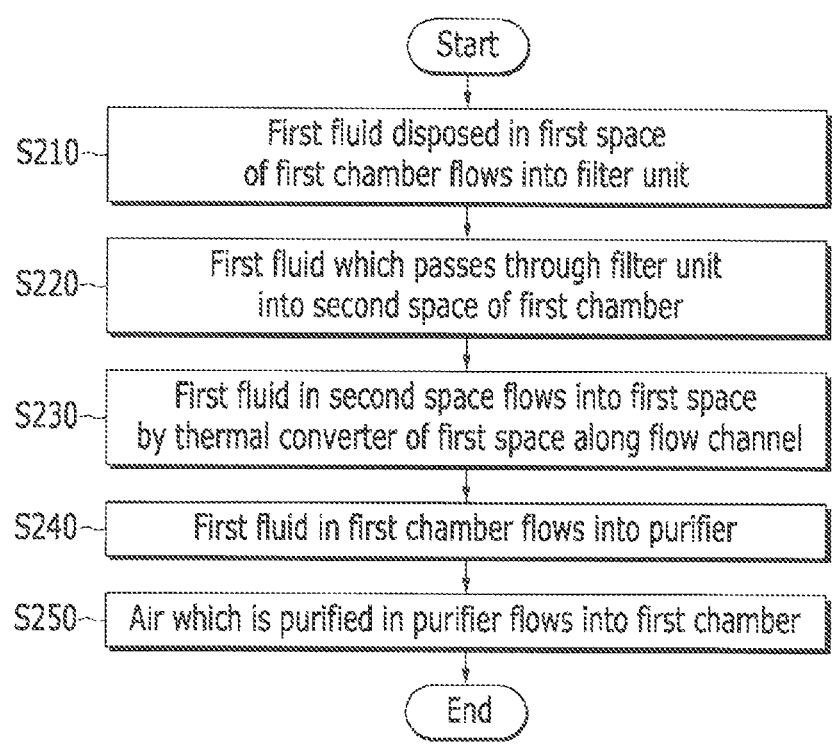
FIG. 5 is a flowchart illustrating a gas purifying method according to another exemplary embodiment.

FIG. 5 is a flowchart illustrating a gas purifying method according to another exemplary embodiment.

Hereinafter, a gas purifying method which purifies a gas using the above-described gas purifying apparatus will be described in more detail.

Referring to FIG. 5, first, in step S210, the first fluid which is disposed in the first space 13 of the first chamber 1' or 1" flows into the filter unit 10.

In step S220, the first fluid which passes through the filter unit 10 flows into the second space 14 of the first chamber 1' or 1".

In this case, the first fluid which flows into the second space 14 may pass through the membrane 141 which is provided below the filter unit 10.

Further, the first fluid which passes through the membrane 141 may further pass through the porous plate 142.

In step S230, the first fluid which passes through the porous plate 142 is guided by the guide plate 143 to flow into the flow channel 15 and flows into the first space 13 by the thermal converter 22 of the first space 13 along the flow channel 15.

In the meantime, in step S240, the first fluid which flows in the first chamber 1' or 1" may flow into the purifier 21 during the flowing.

In step S250, the first fluid which is purified by the purifier 21 flows into the first chamber 1' or 1", again.

In this case, a step of allowing the cooling water to flow into the cooler and then discharging the cooling water to the outside of the cooler may be further provided in order to cool the heat generated during the purifying process in the purifier 21.

The above-described steps S210 to S250 may be repeated several times. When a series of processes are performed, moisture or oxygen may be saturated in the purifier 21. Therefore, a step of allowing the second fluid to flow, and the second fluid to react with the saturated gas to discharge the generated reaction gas, may be further provided in order to remove the saturated gas.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 1, 1', 1": First chamber | 10: Filter unit |
| 11: First filter unit | 12: Second filter unit |
| 13: First space | 14: Second space |
| 141: Membrane | 142: Porous plate |
| 143: Guide plate | 15: Flow channel |
| 2, 2': Second chamber | 21: Purifier |
| 211: Vacuum pump | 22: Thermal converter |
| 221: Blower | 222: Cooler |
| 3: Pipe | 4: Valve |
| I: Purging | II: Circulation |
| III: Regeneration | VI: Cooling |

What is claimed is:

1. A gas purifying apparatus, comprising:
   a first chamber comprising a first inlet, into which a first fluid flows, and a first outlet, through which a part of the first fluid is discharged;
   a purifier which purifies air from the first chamber, which air is then re-injected into the first chamber;
   a conduit which transports air from the first chamber to the purifier;
   a first filter unit which filters air to be transported to the purifier;
   a second filter unit which filters air received from the purifier; and further comprising
   a blower which re-injects air from the purifier into the first chamber.

2. The gas purifying apparatus of claim 1, wherein:
   the first fluid includes He, Ne, Ar or $N_2$ as an inert gas.

3. The gas purifying apparatus of claim 1, wherein:
   in the purifier, a second inlet, into which a second fluid flows, and a second outlet, through which reaction gas generated after the second fluid in the purifier reacts with accumulated contaminants in the purifier is discharged, are disposed.

4. The gas purifying apparatus of claim 3, wherein:
   a vacuum pump is provided at the second outlet.

5. The gas purifying apparatus of claim 1, further comprising:
   a cooler which is provided adjacent to the blower to cool heat generated during a gas purifying process.

6. The gas purifying apparatus of claim 5, further comprising:
   a second chamber which is disposed outside the first chamber, and
   the purifier, the blower, and the cooler being provided in the second chamber.

7. The gas purifying apparatus of claim 1, wherein:
   the first filter unit and second filter unit are provided in the first chamber.

8. A gas purifying method which uses the gas purifying apparatus of claim 1 to purify a gas, comprising:
   allowing a first fluid, which is flowable in a first chamber, to flow into the first chamber;
   passing air in the first chamber through a first filter unit;
   allowing the air which passes through the first filter unit to flow into a purifier;
   allowing the air which is purified in the purifier to flow into a second filter unit;
   allowing the air which passes through the second filter unit to flow into the first chamber; and
   discharging a part of the first fluid to the outside of the first chamber.

9. The gas purifying method of claim 8, further comprising:
   allowing a second fluid to flow into the purifier to react the second fluid with saturated gas in the purifier, and then discharging gas generated after the reaction.

10. The gas purifying method of claim 8, further comprising:
    discharging cooling water to the outside of a cooler after allowing the cooling water to flow into the cooler to cool heat generated in the purifier.

* * * * *